US011198138B2

United States Patent
Shin et al.

(10) Patent No.: US 11,198,138 B2
(45) Date of Patent: Dec. 14, 2021

(54) ELECTRIFICATION APPARATUS FOR ELECTRIC DUST COLLECTION AND CONTROL METHOD THEREFOR

(71) Applicant: LG Electronics Inc., Seoul (KR)

(72) Inventors: Namgyu Shin, Seoul (KR); Naehyun Park, Seoul (KR); Hyunmin Shim, Seoul (KR); Keonwang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 554 days.

(21) Appl. No.: 16/049,517

(22) Filed: Jul. 30, 2018

(65) Prior Publication Data

US 2020/0023379 A1 Jan. 23, 2020

(30) Foreign Application Priority Data

Jul. 23, 2018 (KR) .......................... 10-2018-0085533

(51) Int. Cl.
| | |
|---|---|
| *B03C 3/68* | (2006.01) |
| *B03C 3/38* | (2006.01) |
| *B03C 3/47* | (2006.01) |
| *B03C 3/09* | (2006.01) |
| *B03C 3/60* | (2006.01) |
| *B60H 3/00* | (2006.01) |

(52) U.S. Cl.
CPC .................. *B03C 3/68* (2013.01); *B03C 3/09* (2013.01); *B03C 3/38* (2013.01); *B03C 3/47* (2013.01); *B03C 3/60* (2013.01); *B60H 3/0078* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,643,745 | A * | 2/1987 | Sakakibara | B03C 3/12 96/76 |
| 5,322,550 | A * | 6/1994 | Park | B03C 3/40 96/66 |
| 5,456,741 | A * | 10/1995 | Takahara | B03C 3/12 95/6 |
| 5,820,660 | A * | 10/1998 | Ko | B03C 3/74 96/30 |
| 6,168,689 | B1 * | 1/2001 | Park | B01D 53/323 204/164 |

(Continued)

FOREIGN PATENT DOCUMENTS

| | | | |
|---|---|---|---|
| KR | 20160015640 A | * | 2/2016 |
| KR | 20160084756 A | * | 7/2016 |
| KR | 10-2017-0020102 | | 2/2017 |

*Primary Examiner* — Christopher P Jones
*Assistant Examiner* — Sonji Turner
(74) *Attorney, Agent, or Firm* — Fish & Richardson P.C.

(57) ABSTRACT

The present invention relates to an electrification apparatus for electric dust collection and a control method therefor. According to the teachings of the present invention, there is provided an electrification apparatus for electric dust collection including: a frame, conductive, and conductive plates. The electrification apparatus further includes a ground unit which is disposed between the conductive microfiber and the conductive plate. At this time, the ground unit is insulated when a high voltage is applied to the conductive microfiber and is connected to the ground electrode when a high voltage is blocked to the conductive microfiber.

14 Claims, 13 Drawing Sheets

(56) References Cited

U.S. PATENT DOCUMENTS

| | | | | |
|---|---|---|---|---|
| 7,332,019 B2* | 2/2008 | Bias | ............................ | B03C 3/72 96/15 |
| 7,351,274 B2* | 4/2008 | Helt | ............................ | B03C 3/12 95/2 |
| 7,438,747 B2* | 10/2008 | Luo | ............................ | H01T 23/00 361/226 |
| 7,601,204 B2* | 10/2009 | Woodruff | ................. | B03C 3/017 96/30 |
| 7,655,076 B2* | 2/2010 | Griffiths | ..................... | B03C 3/47 96/64 |
| 8,889,079 B2* | 11/2014 | Zahedi | ..................... | A61L 9/015 422/171 |
| 9,847,623 B2* | 12/2017 | Sunshine | ................. | H01T 23/00 |
| 10,384,517 B2* | 8/2019 | Jee | ............................ | B03C 3/40 |
| 2006/0130658 A1* | 6/2006 | Chang | ........................ | B03C 3/09 96/77 |
| 2013/0336838 A1* | 12/2013 | Waddell | ..................... | A61L 9/22 422/4 |
| 2018/0162201 A1* | 6/2018 | Jee | ............................ | B03C 3/41 |

* cited by examiner

ELECTRIFICATION APPARATUS FOR ELECTRIC DUST COLLECTION AND CONTROL METHOD THEREFOR

CLAIM OF PRIORITY

This application claims priority to Korean Patent Application Serial No. 10-2018-0085533 filed Jul. 23, 2018, the entire contents of which are hereby incorporated by reference.

BACKGROUND

The present invention relates to an electrification apparatus for electric dust collection and a control method therefor.

An electrification apparatus for electric dust collection is an apparatus for removing dust particles in the air. Generally, the electrification apparatus for electric dust collection includes a high voltage application unit for generating ions into the air, and a ground electrode application unit for forming an electric field with the high voltage application unit.

The dust particles in the air are electrified by the ions generated in the high voltage application unit, and the electrified dust particles in the ground electrode application unit can be collected. In addition, the electrification apparatus for electric dust collection may be provided together with a separate collector. The electrification apparatus and the collector may be collectively referred to as an electric dust collector or an electric dust collection assembly.

The electrification apparatus for electric dust collection can generally be installed in a predetermined product. In addition, the electrification apparatus for electric dust collection can be independently installed in the air to remove dust in the air.

For example, the electrification apparatus for electric dust collection may be installed in various products such as an air conditioner, an air purifier, and a humidifier. Particularly, the electrification apparatus for electric dust collection can be installed inside an air conditioner for a vehicle.

At this time, the present applicant has filed and disclosed the following related art relating to an ion generating device that generates ions in the air to remove dust particles in the air.

<Related Art 1>

1. Korea patent publication number: 10-2017-0020102 (publication date: Feb. 22, 2017)

2. Title of the Invention: Ion generating device

As disclosed in the related art 1, the ion generating device includes a discharge electrode that discharges by a high voltage to ionize molecules in the air. In addition, the ion generating device further includes a ground electrode which is disposed apart from the discharge electrode and which is grounded. At this time, the ground electrode functions to remove surplus ions among the ions generated by the discharge electrode to maintain a discharge current.

The related art 1 has the following problems.

(1) As in a case of the discharge electrode, in a case where the molecules in the air are ionized by discharging, the peripheral non-conductors may be electrified. In order to prevent this, the ground electrode is disposed in the related art 1, but the non-conductor disposed between the discharge electrode and the ground electrode is continuously electrified.

(2) Particularly, there is a problem that the performance of the discharge electrode is greatly deteriorated as a support portion for fixing the discharge electrode at a predetermined position is electrified. As a result, there is a problem the electrification performance is deteriorated and the dust particles in the air cannot be effectively removed.

(3) In addition, a separate member (ground electrode) is required to prevent the non-conductor from being electrified. Accordingly, the material cost increases, the degree of freedom in installation decreases, and the manufacturing process takes a relatively long time.

SUMMARY

In order to solve such a problem, an objective of the present embodiment is to propose an electrification apparatus for electric dust collection to prevent electrification of a non-conductor through a simple switching circuit and a control method therefor.

In addition, an objective of the present invention is to provide an electrification apparatus for electric dust collection having a ground unit for preventing electrification of a non-conductor disposed between a conductive microfiber and a conductive plate and a control method therefor.

In addition, an objective of the present invention is to propose an electrification apparatus for electric dust collection which is grounded or insulated, if necessary, and a control method therefor.

According to the teachings of the present invention, there is provided an electrification apparatus for electric dust collection including: a frame which forms an outer appearance, conductive microfiber which is installed on the frame and generate ions in air by applying a high voltage, and conductive plates which are installed so as to surround the conductive microfiber and connected to the ground electrode to generate a potential difference with the conductive microfiber. The electrification apparatus further includes a ground unit which is disposed between the conductive microfiber and the conductive plate.

At this time, the ground unit is insulated in a case where a high voltage is applied to the conductive microfiber and is connected to the ground electrode in a case where a high voltage is blocked to the conductive microfiber.

Meanwhile, According to the teachings of the present invention, there is provided a control method for an electrification apparatus for electric dust collection including: operating a general operation mode in which a high voltage is applied to a conductive microfiber, a ground electrode is connected to a conductive plate forming an electrification space in which the conductive microfiber is positioned at the center thereof, an electric field is formed in the electrification space, and the conductive microfiber is discharged to generate ions in the air.

Then, it is determined whether or not a discharge mode for removing surplus ions is necessary, and the discharge mode is operated.

According to the proposed embodiment, there is an advantage that the electrification performance can be maintained by removing surplus ions and the electrification efficiency can be increased.

In particular, there is an advantage that the surplus ions can be removed through a simple switching circuit without adding a separate configuration. Specifically, there is an advantage that the surplus ions can be easily removed by applying a high voltage of different polarities to the conductive microfiber.

In addition, there is an advantage that surplus ions can be more effectively removed by adding a ground unit. There is an advantage that surplus ions can be removed simply and effectively as the ground unit is insulated in the general operation mode and grounded in the discharge mode.

In addition, since the ground unit can be disposed in various shapes, there is an advantage that the degree of freedom of design is high despite the addition of the configuration.

DETAILED DESCRIPTION OF THE EMBODIMENTS

Figure 1:
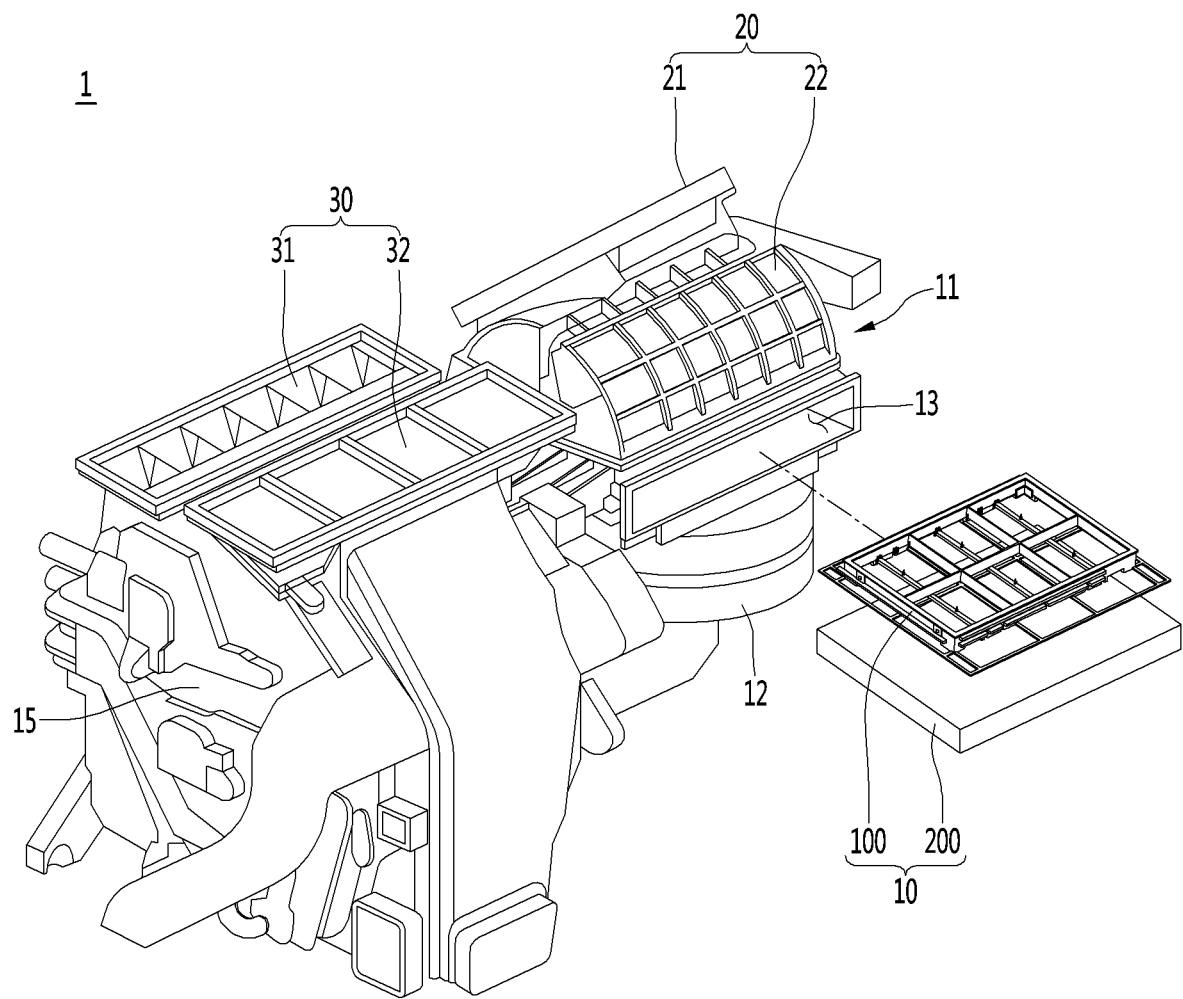
FIG. 1 is a view illustrating an installation example of an electrification apparatus for electric dust collection according to a first embodiment of the present invention.

Hereinafter, some embodiments of the present invention will be described in detail with reference to exemplary drawings. It is to be noted that, in adding reference numerals to the constituent elements of the drawings, the same constituent elements are denoted by the same reference numerals whenever possible, even if the same constituent elements are illustrated in different drawings. In addition, in the following description of the embodiments of the present invention, a detailed description of known functions or configurations incorporated herein will be omitted in a case where it is determined that the detailed description thereof hinders understanding of the embodiment of the present invention.

In addition, in describing the constituent elements of the embodiment of the present invention, terms such as first, second, A, B, (a), and (b) may be used. These terms are intended to distinguish the constituent elements from other constituent elements, and the terms do not limit the nature, order or sequence of the constituent elements. In a case where a constituent element is described as being "connected", "coupled", or "accessed" to another constituent element, although the constituent element may be directly connected or accessed to the other constituent element, it should be understood that another constituent element may be "connected", "coupled", or "accessed" between the respective constituent elements.

FIG. 1 is a view illustrating an installation example of an electrification apparatus for electric dust collection according to the first embodiment of the present invention.

As illustrated in FIG. 1, an electrification apparatus 100 for an electric dust collection according to the teachings of the present invention can be installed in an air conditioner 1 for a vehicle. However, this is an example and the electrification apparatus 100 for electric dust collection (hereinafter, electrification apparatus) may be installed independently or installed in another product.

In addition, the electrification apparatus 100 may be installed in the air conditioner 1 for a vehicle together with the collector 200. The electrification apparatus 100 and the collector 200 may be referred to as an electric dust collection assembly 10.

First, the air conditioner 1 for a vehicle will be briefly described.

The air conditioner 1 for a vehicle includes a main body 11, 15 which forms an outer appearance. The main body may be divided into a suction main body 11 on which the suction port 20 is formed and a discharge main body 15 in which the discharge port 30 is formed.

The suction main body 11 and the discharge main body 15 are connected to each other to allow air to flow. Specifically, the suction main body 11 and the discharge main body 15 are connected to each other so that air flows from the suction main body 11 to the discharge main body 15. However, this is an example, and the air conditioner 1 for a vehicle may be provided as an integral main body.

A plurality of the suction port 20 and a plurality of the discharge port 30 may be formed in the suction main body 11 and the discharge main body 15, respectively.

The suction port 20 includes an indoor suction port 21 and an outdoor suction port 22. The indoor suction port 21 is understood as an opening through which the air inside the vehicle provided with the air conditioner 1 for a vehicle flows into the inside of the main body 11. In addition, it is to be understood that the outdoor suction port 22 is an opening through which the outside air of the vehicle flows into the inside of the main body 11.

The discharge port 30 includes a front discharge port 31 and a defrost discharge port 32. The front discharge port 31 is understood as an opening through which the air discharged from the main body 11 flows into the inside of the vehicle. In addition, the defrost discharge port 32 is understood as an opening through which the air discharged from the main body 11 flows into the windshield of the vehicle. Through the defrost discharge port, it is possible to remove frost formed in the windshield of the vehicle.

This is an example, and the suction port 20 and the discharge port 30 may be formed in various positions and numbers. For example, the discharge port 30 may further include a discharge port that discharges air to the lower side of the vehicle or a discharge port that discharges air to the rear side of the vehicle.

In addition, the air conditioner 1 for a vehicle includes a fan and a heat exchanger installed inside the main bodies 11 and 15 but is omitted in FIG. 1 for the convenience of illustration.

Specifically, a fan may be installed inside the suction main body 11. In other words, the fan can be disposed adjacent to the suction port 20. As the fan is driven, air flows into the suction main body 11 through the suction port 20. Then, air can flow from the suction main body 11 to the discharge main body 15.

A heat exchanger or a heater may be disposed in the discharge main body 15. Accordingly, the air flowing into the discharge main body 15 passes through the heat exchanger or the like and can be cooled or heated and may be discharged to the inside of the vehicle through the discharge port 30.

In addition, the air conditioner 1 for a vehicle may further include a plurality of suction ports 20 and a damper (not illustrated) for selectively opening the discharge ports 30. For example, the damper may open any one of the indoor suction port 21 and the outdoor suction port 22 and close the other. In addition, the damper may open at least one of the plurality of discharge ports 30.

In addition, in the air conditioner 1 for a vehicle according to the teachings of the present invention, an electric dust collection assembly 10 is installed. The electric dust collection assembly 10 corresponds to a configuration in which dust particles or the like in the air flowing into the air conditioner 1 for a vehicle are electrified and collected.

At this time, the electric dust collection assembly 10 may be installed in another product other than the air conditioner 1 for a vehicle. Accordingly, FIG. 1 corresponds to an example in which the electric dust collection assembly 10 is installed. In addition, the electric dust collection assembly 10 may be installed in an independent product (for example, an air purifier) to remove dust particles in the air.

The electric dust collection assembly 10 includes an electrification apparatus 100 for electric dust collection (hereinafter, electrification apparatus) and a collector 200 for electric dust collection (hereinafter, collector).

The electrification apparatus 100 functions to electrify foreign matters such as dust particles in the air. The collector 200 functions to collect dust particles and the like electrified by the electrification apparatus 100 and remove dust particles and the like from the air.

The electrification apparatus 100 includes the conductive microfiber 120 and the conductive plate 130, which will be described later. A high voltage is applied to the conductive microfiber 120, and a ground electrode is applied to the conductive plate 130.

Accordingly, the electrification apparatus 100 generates ions in the air to form an electric field. At this time, it is understood that the conductive plate 130 generates a potential difference with the conductive microfiber 120 to form an electric field. In addition, electrified particles can be collected on the conductive plate 130.

The collector 200 may be made of various materials collecting the electrified particles by the electrification apparatus 100. For example, the collector 200 may be a porous fiber filter such as a nonwoven fabric. The surface of the collector 200 may be applied, coated or attached with a conductive material. Then, a predetermined current is applied to the collector 200, so that the electrified dust particles and the like can be collected.

In summary, dust particles or the like in the air passing through the electric dust collection assembly 10 are coupled with the ions generated in the electrification apparatus 100 and are electrified. The electrified dust particles and the like can be collected in the electrification apparatus 100 or the collector 200.

Thus, the electrification apparatus 100 can function not only to generate ions but also to collect electrified dust particles and the like. Therefore, the electrification apparatus 100 may be referred to as a 'primary filter' and the collector 200 as a 'secondary filter'. Dust particles or the like in the air can be removed more easily as dust particles or the like in the air pass through the primary filter and the secondary filter in order.

At this time, in the electric dust collection assembly 10 according to the teachings of the present invention, the electrification apparatus 100 and the collector 200 are provided as separate devices, and thus is referred to as "assembly" in which a separate device is assembled or adjacently installed.

Specifically, the electrification apparatus 100 and the collector 200 can be produced and distributed through different manufacturing processes and distribution processes. In addition, the electrification apparatus 100 and the collector 200 may be coupled to each other by a separate coupling member or the like.

In addition, as described above, the electrification apparatus 100 can perform both the function of generating ions and the function of collecting dust particles. Accordingly, the electrification apparatus 100 may be installed as an independent product separately from the collector 200.

In other words, the electrification apparatus 100 may be installed in a general air conditioner or other products other than the air conditioner 1 for a vehicle. In addition, the electrification apparatus 100 may be installed independently.

In addition, the electrification apparatus 100 and the collector 200 may be installed in a predetermined product, respectively. For example, the electrification apparatus 100 and the collector 200 may be installed in the air conditioner 1 for a vehicle, respectively.

With reference to FIG. 1, the air conditioner 1 for a vehicle is provided with a dust collection installation portion 13 on which the electric dust collection assembly 10 is installed. Specifically, the dust collection installation portion 13 is formed in the suction main body 11 adjacent to the suction port 20. Particularly, the dust collection installation portion 13 is disposed at the lower side in the flow direction of the air flowing into the suction port 20.

This is because the air flowing into the suction port 20 is firstly passed through the electric dust collection assembly 10. In summary, the air flowing into the air conditioner 1 for a vehicle passes through the electric dust collection assembly 10 first, and dust particles and the like can be removed. Accordingly, it is possible to prevent foreign matters from adhering to the fan, the heat exchanger, and the like.

In addition, the air conditioner 1 for a vehicle is provided with a fan installation portion 12 on which the fan is installed. Specifically, the fan installation portion 12 is formed in the suction main body 11 adjacent to the suction port 20. Particularly, the fan installation portion 12 is disposed below the flow direction of air in the dust collection installation portion 13.

Therefore, in the suction main body 11, the suction port 20, the dust collection installation portion 13, and the fan mounting unit 12 are disposed in order in the air flow direction. Accordingly, the air flowing into the suction port 20 passes through the electric dust collection assembly 10 and the fan in order and flows into the discharge main body 15.

At this time, the electrification apparatus 100 and the collector 200 may be installed in the dust collection installation portion 13, respectively. Particularly, the collector 200 is disposed below in the flow direction of air in the electrification apparatus. Accordingly, the air flowing into the suction port 20 can pass through the electrification apparatus 100 and the collector 200 in order.

The electrification apparatus 100 may be installed in the dust collection installation portion 13 in a state where the collector 200 is seated. In other words, the electrification apparatus 100 and the collector 200 may be overlapped and seated on the dust collection installation portion 13.

In addition, a portion for fixing the electrification apparatus 100 may be formed on the inside of the dust collection installation portion 13. Accordingly, the electrification apparatus 100 may be installed in the dust collection installation portion 13, and the collector 200 may be installed in the lower portion of the electrification apparatus 100.

As described above, the electrification apparatus 100 and the collector 200 can be managed, respectively, since the electrification apparatus 100 and the collector 200 are installed, respectively. For example, the user can separate, replace, and clean the collector 200 only in the air conditioner 1 for a vehicle.

In particular, the replacement cycles of the electrification apparatus 100 and the collector 200 may be different from each other. Generally, since a larger amount of dust particles are collected in the collector 200, the replacement cycle of the collector 200 can be shorter than that of the electrification apparatus 100. Therefore, the user can replace only the collector 200 without the need to separate the electrification apparatus 100.

Hereinafter, the electrification apparatus 100 will be described in detail.

Figure 2:
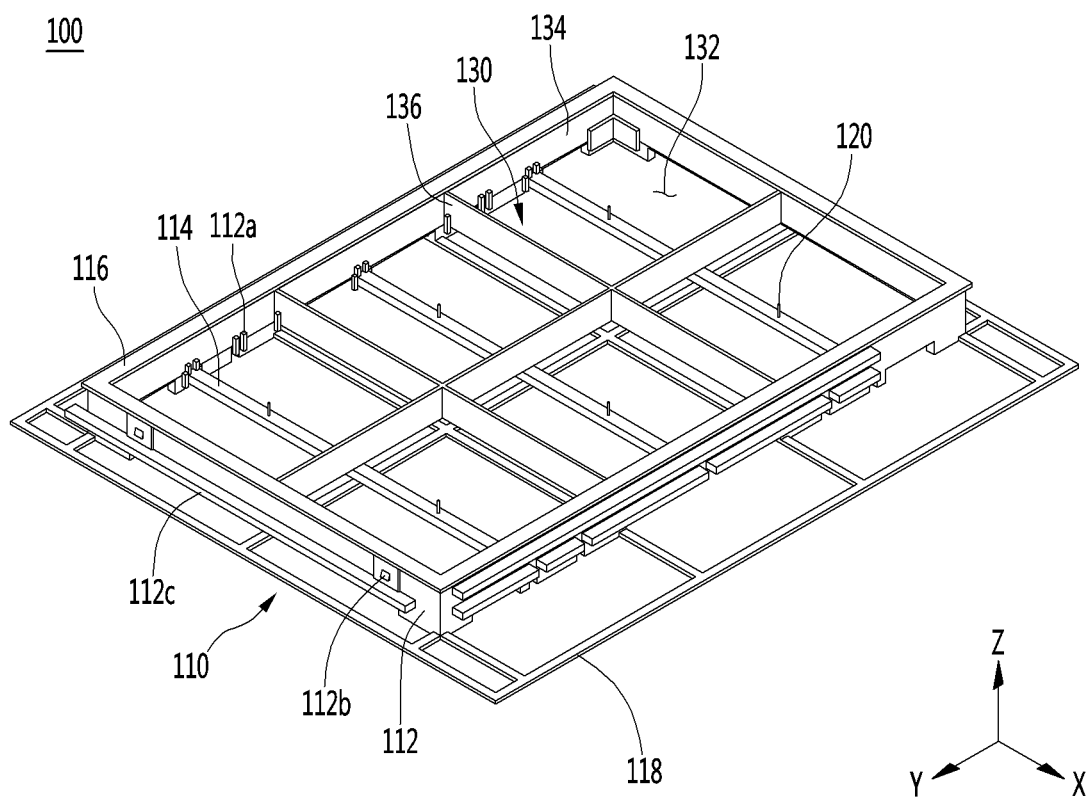
FIG. 2 and FIG. 3 are views illustrating an electrification apparatus for electric dust collection according to the first embodiment of the present invention.
Figure 3:
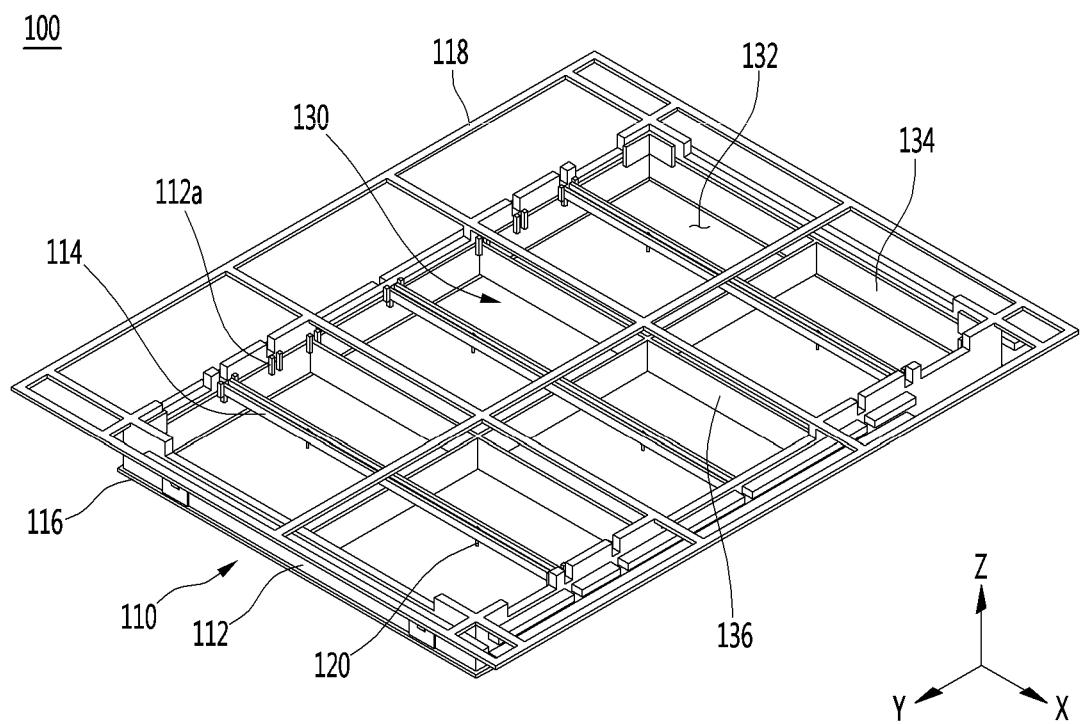
Figure 4:
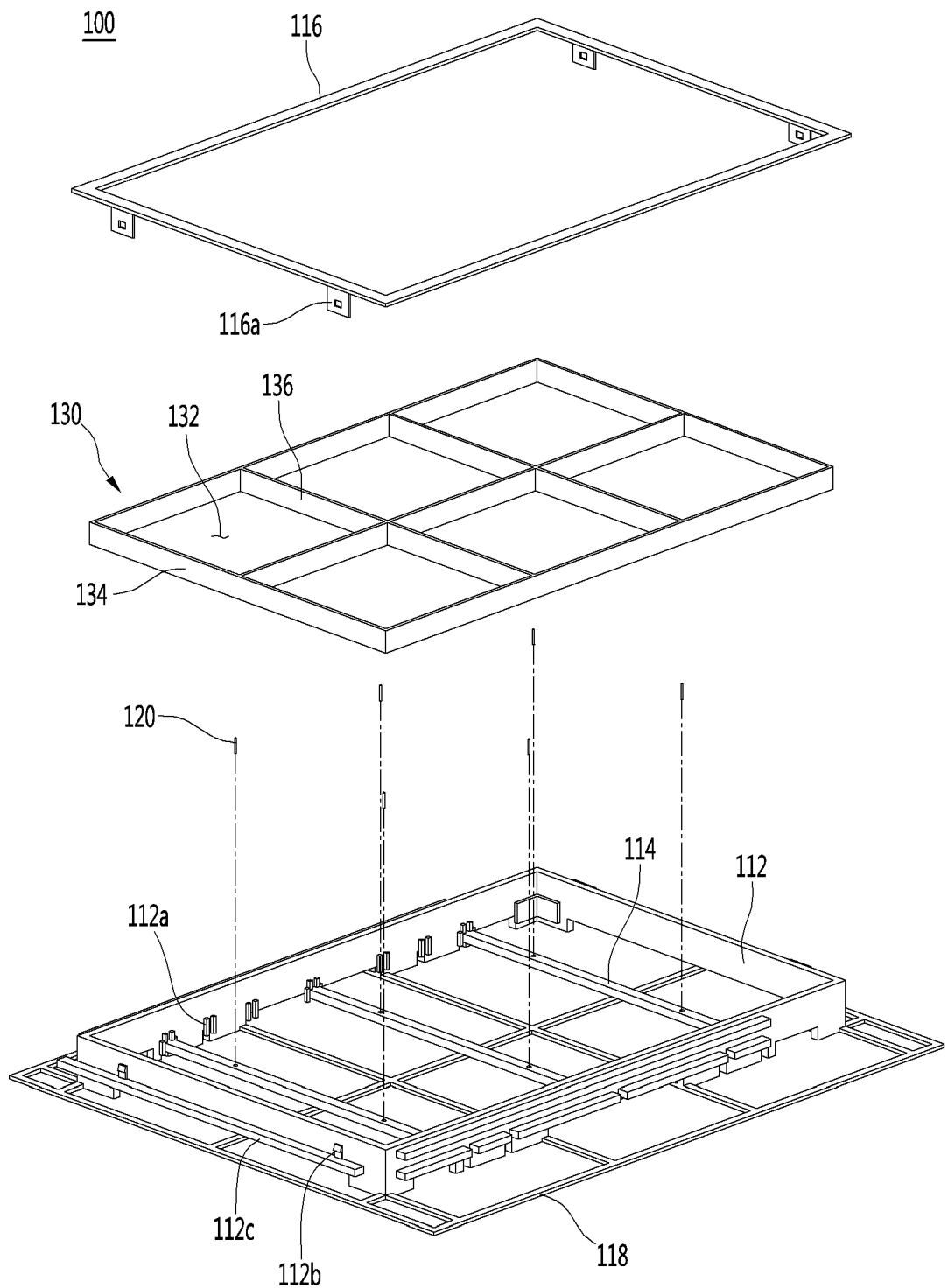
FIG. 4 is an exploded view illustrating the electrification apparatus for electric dust collection

FIGS. 2 and 3 are views illustrating an electrification apparatus for electric dust collection according to the first embodiment of the present invention, and FIG. 4 is an exploded view illustrating the electrification apparatus for electric dust collection according to the first embodiment of the present invention.

FIG. 2 is a front perspective view of the electrification apparatus 100, and FIG. 3 is a rear perspective view of the electrification apparatus 100. In addition, FIG. 4 is a front perspective view of the electrification apparatus 100 in which the respective components are separated.

In addition, for the convenience of explanation, FIGS. 2 to 4 illustrate X, Y, and Z axes perpendicular to each other. In this case, the X, Y, and Z axes are illustrated to illustrate the relationship between each other, and the (+) and (−) directions of each axis are not distinguished.

As illustrated in FIGS. 2 to 4, the electrification apparatus 100 includes a frame 110 which forms an outer appearance, conductive microfiber 120 which is provided on the frame 110, and a conductive plate 130.

The frame 110 is understood as a configuration for disposing and fixing the conductive microfiber 120 and the conductive plate 130 at predetermined positions. In addition, the frame 110 may be mounted in a space in which the electrification apparatus 100 is installed, for example, the dust collection installation portion 13 of the air conditioner 1 for a vehicle described above.

In addition, the frame 110 is made of a non-conductive material and may be formed of, for example, plastic. In addition, the frame 110 may be formed in various shapes through an injection process or the like.

The conductive microfiber 120 is understood as a configuration which is discharged by a high voltage to ionize molecules in the air. For example, the conductive microfiber 120 can generate anions such as OH—, O—, and the like, or cations such as H+in the air.

The conductive microfiber 120 is connected to electric wires for applying a high voltage but are omitted in FIGS. 2 to 4 for the sake of convenience. In addition, the conductive microfiber 120 may be understood as one end portion of an electric wire to which a high voltage is applied.

In addition, the conductive microfiber 120 include carbon fibers. The carbon fibers are formed into superfine fibers having a diameter in the micrometer unit. When a high voltage is applied to the carbon fibers, ions are generated in the air by corona discharge.

At this time, the conductive microfiber 120 is provided in the form of a carbon brush in which hundreds or thousands of carbon fibers form one bundle. Hereinafter, one conductive microfiber 120 means one carbon brush.

In addition, the conductive microfiber 120 is disposed on the frame 110 so as to extend in the Z-axis direction. At this time, the Z-axis may correspond to an axis extending in the air flow direction. In summary, the conductive microfiber 120 may be disposed on the frame 110 in parallel with the flow direction of the air.

It is understood that the conductive plate 130 forms an electric field with the conductive microfiber 120. In addition, a ground electric wire to which a ground electrode is applied is connected to the conductive plate 130. Accordingly, between the conductive plate 130 and the conductive microfiber 120, a potential difference is generated and an electric field can be formed.

In addition, electrons can be moved to the ground electrode. Accordingly, high-density ions can be generated between the conductive microfiber 120 and the conductive plate 130. In addition, the electrification efficiency of dust particles and the like can be improved due to the electric field formed between the conductive microfiber 120 and the conductive plate 130.

In addition, the conductive plate 130 is formed of a conductive material such as metal. Accordingly, the conductive plate 130 can be understood as a metal plate having a predetermined thickness.

In addition, since the conductive plate 130 is provided as a flat plate having a predetermined area along the Z-axis, predetermined dust particles and the like can be collected. In other words, the electrified dust particles and the like can be collected in the conductive plate 130. Therefore, the electrification apparatus 100 can also perform a function of collecting the electrified dust particles and the like.

In addition, the conductive plate 130 is disposed to surround the conductive microfiber 120. Specifically, the conductive plate 130 forms a predetermined space to surround the conductive microfiber 120.

Hereinafter, the space formed by the conductive plate 130 is referred to as an electrification space 132. At this time, the electrification space 132 means space closed in the X-Y-axis direction by the conductive plate 130 and opened in the Z-axis direction.

In particular, the conductive plate 130 according to the teachings of the present invention forms a square columnar space.

Specifically, the electrification space 132 has a rectangular shape on a plane, and a rectangular columnar space extending in the Z-axis can be formed. At this time, the rectangular shape formed on the X-Y plane may correspond to a square. In other words, the electrification space 132 can be understood as a square columnar space.

The conductive microfiber 120 is positioned at the center of the electrification space 132. Specifically, the conductive microfiber 120 is positioned at the center of the electrification space 132 on the X-Y plane and extend in the Z-axis.

At this time, the electrification space 132 refers to a space formed to surround one conductive microfiber 120. Therefore, the electrification space 132 may be formed corresponding to the number of the conductive microfibers 120.

In summary, the conductive plate 130 forms a rectangular cross-section perpendicular to the flow direction of air. The conductive microfiber 120 is positioned at the center of a rectangular cross-section.

The electrification apparatus 100 may include a plurality of conductive microfibers 120. The conductive plate 130 may form a plurality of electrification spaces 132 corresponding to the plurality of conductive microfibers 120.

The plurality of conductive microfibers 120 are disposed apart from each other in the X-Y plane. In addition, each of the conductive microfibers 120 may be disposed at the same interval as the neighboring conductive microfibers 120. In addition, the plurality of conductive microfibers 120 may be arranged in parallel with the adjacent conductive microfibers 120 along the X-axis or the Y-axis. For example, as illustrated in FIGS. 2 to 4, six conductive microfibers 120 can be provided.

The plurality of electrification spaces 132 are formed on the X-Y plane in a state of being separated from each other so as to correspond to the plurality of conductive microfibers 120. The conductive plate 130 includes an outer plate 134 for forming the plurality of electrification spaces 132 and an inner plate 136 for separating the plurality of electrification spaces 132.

The outer plate 134 can be understood as a configuration that forms an outer appearance of the conductive plate 130. Specifically, the outer plate 134 may be provided in a rectangular frame shape.

The outer plate 134 forms a space in which the plurality of electrification spaces 132 are coupled. Specifically, the outer plate 134 has a rectangular shape in the X-Y plane and forms a rectangular columnar space extending in the Z-axis.

The inner plate 136 may be understood as a configuration that divides the space formed by the outer plate 134 into the electrification spaces 132. Accordingly, both ends of the inner plate 136 can be connected to the outer plate 134. In particular, the inner plate 136 extends in the X-axis or the Y-axis. For example, the inner plate 136 may divide the space formed by the outer plate 134 into six electrification spaces 132.

At this time, the outer plate 134 and the inner plate 136 may be integrally formed with each other. Alternatively, the outer plate 134 and the inner plate 136 may be separately fabricated and coupled with each other.

In the electrification apparatus of the related art, the electrification space is formed into a cylindrical shape around the conductive microfibers. Thereby, air cannot flow between the electrification spaces, or a death zone can be formed which cannot be electrified.

However, in a case where the electrification space is formed into a square columnar shape as in the present invention, there is no dead space between the electrification spaces. Therefore, the electrification space per the same space can be maximized. Accordingly, the flow rate of the air passing through the electrification space can be maximized.

The frame 110 includes a main body frame 112 on which the conductive plate 130 is installed and an installation frame 114 on which the conductive microfibers 120 are installed.

The main body frame 112 can be understood as a configuration that forms an outer appearance of the frame 110. In addition, the outer plate 134 may be fitted to the main body frame 112. Accordingly, the main body frame 112 is provided in a shape corresponding to the outer plate 134.

Therefore, the main body frame 112 is provided in a rectangular frame shape as in the outer plate 134. Specifically, the outer plate 134 is installed on the main body frame 112 such that the outer surface of the outer plate 134 is in contact with the inner surface of the main body frame 112.

In addition, the main body frame 112 is provided with a plurality of fixing protrusions 112a which are in contact with the inner surface of the outer plate 134. In addition, the outer plate 134 may be fixed to the main body frame 112 by means of a bonding member such as a bond.

In addition, the frame 110 further includes a cover frame 116 coupled to an upper end of the main body frame 112. The cover frame 116 may be coupled to the main body frame 112 to cover the upper end of the outer plate 134. In other words, the outer plate 134 may be fixed in the Z-axis by coupling of the main body frame 112 and the cover frame 116.

The cover frame 116 and the main body frame 112 can be hooked. For example, the main body frame 112 may have a hook 112b protruding outwardly, and the cover frame 116 may be formed with a hook groove 116a into which the hook 112b is inserted.

In addition, the main body frame 112 is formed with a frame installation portion 112c protruding outwardly and extending along the main body frame 112. The frame installation portion 112c may correspond to a portion which is seated in a product on which the electrification apparatus 100 is installed.

For example, protrusions on which the frame installation portion 112c is seated may be formed on the inside of the dust collection installation portion 13. Therefore, the electrification apparatus 100 may be installed in the dust collection installation portion 13 such that the frame installation portion 112c is seated on the protrusion.

In addition, the frame installation portion 112c may be formed on the outer surface of the main body frame 112. In other words, the frame installation portion 112c may be formed on all four surfaces forming the main body frame 112. Accordingly, the electrification apparatus 100 can be installed by the frame installation portion 112c irrespective of the direction in which the electrification apparatus 100 is installed in the product.

For example, the main body frame 112 or the conductive plate 130 is formed as a rectangular frame having a long surface and a short surface. With reference to FIG. 1, the electrification apparatus 100 is inserted into the dust collection installation portion 13 such that end surface of the electrification apparatus 100 is disposed on both sides of the dust collection installation portion 13. Accordingly, the frame installation portion 112c formed on the end surface of the main body frame 112 can be seated on the inner surface of the dust collection installation portion 13.

The installation frame 114 is installed in an inside of the main body frame 112 in a state of extending into one side. In other words, both ends of the installation frame 114 are fixed to the main body frame 112. In the installation frame 114, a fixing groove 114a into which the conductive microfibers 120 are inserted is formed. At this time, the fixing grooves 114a are formed to correspond to the number of the conductive microfibers 120.

In addition, the frame 110 may further include an auxiliary frame 118. The auxiliary frame 118 can be understood as a configuration that maintains the rigidity of the frame 110. In other words, the auxiliary frame 118 corresponds to a configuration for preventing the main body frame 112 and the installation frame 114 from being deformed. Accordingly, the auxiliary frame 118 may have various shapes according to the design and may be omitted.

As described above, the frame 110 may be formed by an injection process. Accordingly, although the frame 110 has been described Specifically, the frame 110 may be integrally formed.

As described above, the conductive microfibers 120 generate ions into the air, and dust particles in the air can be coupled with ions to be electrified. Thus, the ions coupled with the dust particles are collected in the conductive plate 130 or in a separate collector.

At this time, ions generated in the air by the conductive microfibers 120 but not coupled with dust particles (hereinafter, surplus ions) may exist. The surplus ions float in the electrification space 132 and can be coupled to the frame 110 or the like. Accordingly, the frame 110 can be electrified.

The electric field formed in the electrification space 132 may be weakened as the frame 110, particularly the frame 110 positioned at the electrification space 132, is electrified. Specifically, the surplus ions are disposed between the conductive microfibers 120 and the conductive plate 130 to reduce the potential difference.

In addition, the surplus ions can electrify not only the frame 110 but also the inside of the product in which the electrification apparatus 100 is installed. Accordingly, there is a problem that the operation of the product may be affected or the stability of the user may increase.

Therefore, it is necessary to remove the surplus ions to prevent the above problems. The electrification apparatus according to the teachings of the present invention can remove the surplus ions through a switching circuit. Hereinafter, it will be described specifically.

Figure 5:
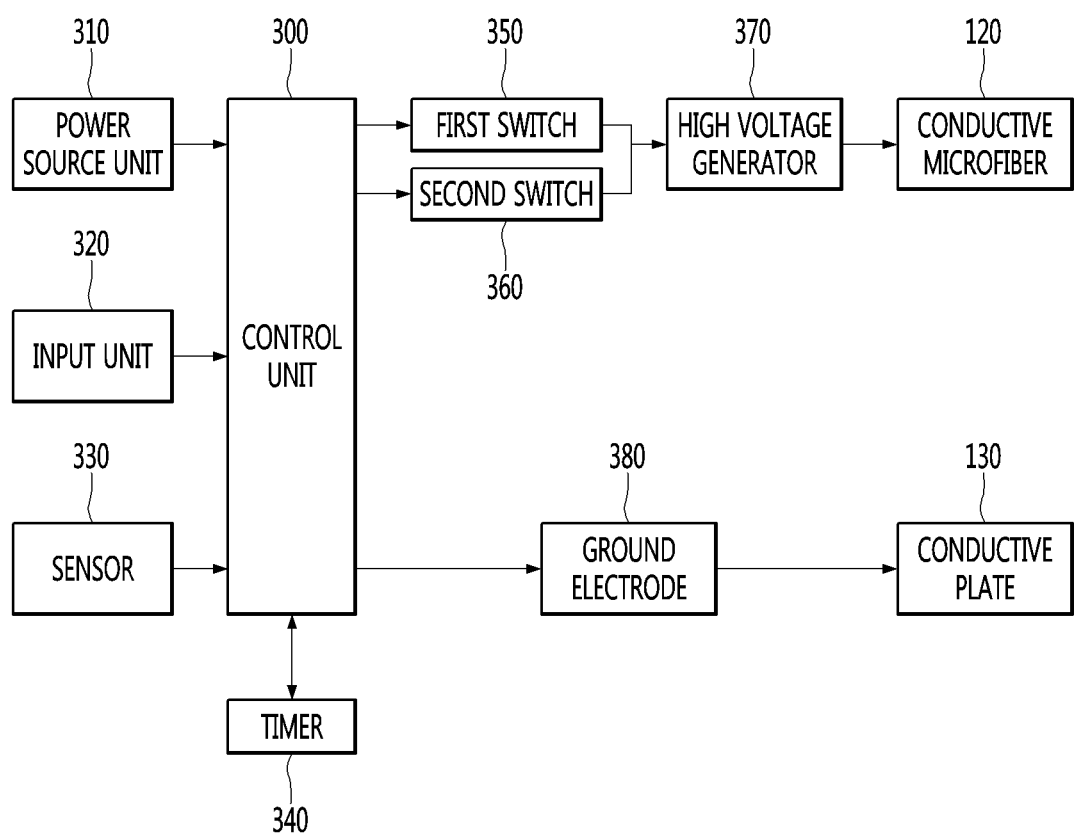
FIG. 5 is a diagram illustrating a control configuration of an electrification apparatus for electric dust collection according to the first embodiment of the present invention.

FIG. 5 is a diagram illustrating a control configuration of an electrification apparatus for electric dust collection according to the first embodiment of the present invention.

As illustrated in FIG. 5, the electrification apparatus 100 for electric dust collection according to the teachings of the present invention is provided with a control unit 300 for controlling various configurations. At this time, the control unit 300 may correspond to a control unit provided in the product in which the electrification apparatus 100 is installed.

In addition, the electrification apparatus 100 includes a power source unit 310, an input unit 320, a sensor 330, and a timer 340. Such a configuration is complementary and exemplary, and only a portion of the configuration may be provided or the configuration may be replaced with another configuration. In addition, the configuration may correspond to a configuration provided in a product in which the electrification apparatus 100 is installed.

The power source unit 310 can be understood as a configuration for turning on/off the power source of the electrification apparatus 100. For example, in a case where the electrification apparatus 100 is installed in the air conditioner 1 for a vehicle, the power source unit 310 may correspond to a power button of the air conditioner 1 for a vehicle. The power source unit 310 may be provided separately from the air conditioner 1 for a vehicle.

The input unit 320 can be understood as a configuration capable of selecting an additional function of the electrification apparatus 100. For example, the input unit 320 may adjust the intensity of the voltage applied to the electrification apparatus 100 or adjust the flow rate of the air passing through the electrification apparatus 100. In addition, the input unit 320 may be provided to select a discharge mode to be described later.

The sensor 330 can be understood as a configuration for detecting various states of the electrification apparatus 100. For example, the sensor 330 may be provided to detect dust particles in the air flowing into the electrification apparatus 100. In addition, the sensor 330 may be provided to detect whether or not the dust particles are electrified in the discharge mode to be described later.

The timer 340 can be understood as a configuration for measuring the time associated with the operation of the electrification apparatus 100. For example, the timer 340 may be provided to measure the operation time of the electrification apparatus 100.

The control unit 300 may apply a predetermined electrode to the conductive microfibers 120 and the conductive plates 130.

Specifically, the control unit 300 may connect a ground electrode 380 to the conductive plate 130. The ground electrode 380 may refer to a reference point of a voltage, that is, a voltage of zero. For example, the ground electrode 380 may correspond to a ground or a conductor that may be replaced with the ground.

In addition, the control unit 300 may connect a high voltage generator 370 to the conductive microfibers 120. Accordingly, a high voltage may be applied to the conductive microfibers 120 and the conductive microfibers 120 may be discharged to generate ions in the air.

At this time, the control unit 300 may transmit an operation signal to the high voltage generator 370 through any one of a first switch 350 and a second switch 360. At this time, the first switch 350 and the second switch 360 may correspond to one switching circuit. In other words, the control unit 300 may selectively transmit an operation signal to the high voltage generator 370.

In addition, the first switch 350 and the second switch 360 may correspond to a switch circuit that is turned on and off, respectively. In other words, the first switch 350 and the second switch 360 may be turned on or off, respectively.

In a case where the control unit 300 transmits a signal to the first switch 350, the high voltage generator 370 may generate a first high voltage. In addition, in a case where the control unit 300 transmits a signal to the second switch 360, the high voltage generator 370 may generate the second high voltage.

The first high voltage and the second high voltage may correspond to voltages of different electrodes from each other. In addition, the intensities of the first high voltage and the second high voltage may be the same.

For example, the first high voltage may be a (+) voltage and the second high voltage may be a (−) voltage. Accordingly, when the control unit 300 transmits a signal to the first switch 350, a (+) high voltage may be applied to the conductive microfibers 120. On the other hand, when the control unit 300 transmits a signal to the second switch 360, a (−) high voltage may be applied to the conductive microfibers 120.

Hereinafter, a control method for removing the surplus ions will be described with such a configuration.

Figure 6:
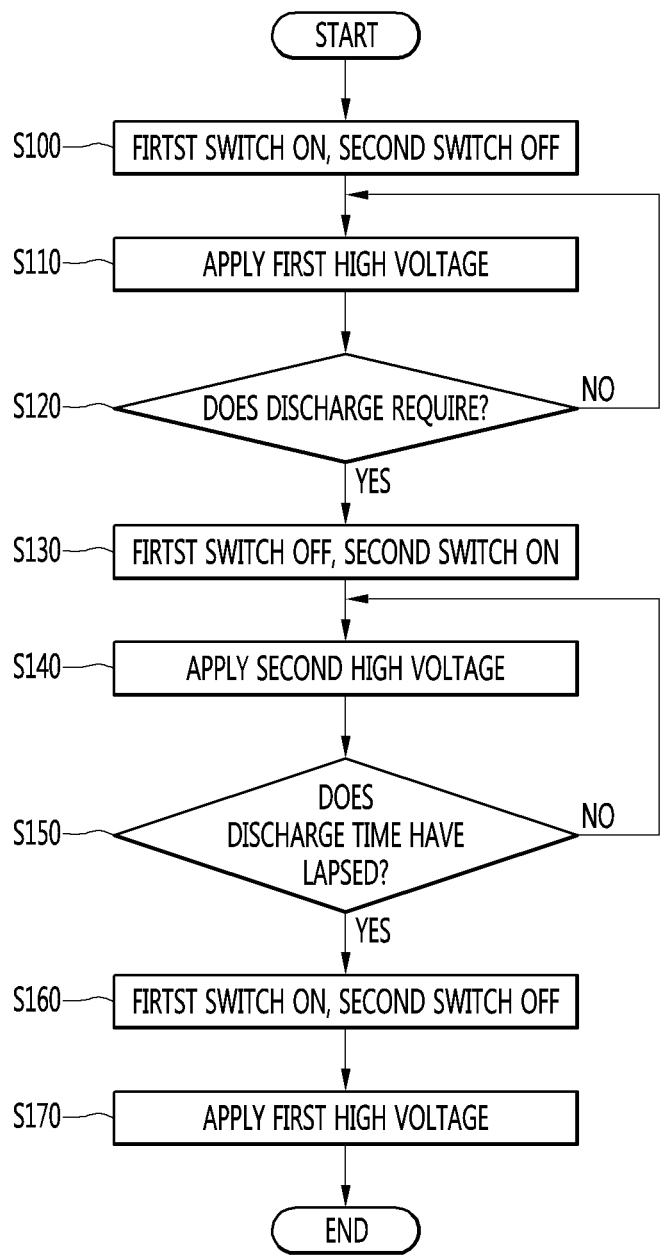
FIG. 6 is a diagram illustrating a control flow of the electrification apparatus for electric dust collection according to the first embodiment of the present invention.

FIG. 6 is a diagram illustrating a control flow of the electrification apparatus for electric dust collection according to the first embodiment of the present invention.

FIG. 6 illustrates a control flow in a case where it is necessary to remove the surplus ions during the operation of the electrification apparatus 100. Therefore, the description will be made on the premise that the electrification apparatus 100 is operated.

As illustrated in FIG. 6, the first switch 350 is turned on and the second switch 360 is turned off (S100). In a case where the control unit 300 transmits a signal to the first switch 350, it can be understood that the first switch 350 is turned on. In addition, in a case where the control unit 300 does not transmit a signal to the second switch 360, it can be understood as a state where the second switch 360 is turned off.

It can be understood as a state where, on the electric circuit, either one of the two wires connected to the high voltage generator 370 is connected and the other is not connected.

Accordingly, the signal of the first switch 350 is transmitted to the high voltage generator 370. The high voltage generator 370 applies the first high voltage to the conductive microfibers 120 (S110).

For example, in a state where the first high voltage is a (+) voltage, the conductive microfibers 120 are discharged to generate (+) ions in the air. Accordingly, (+) ions float in the electrification space 132 and can couple with the dust particles to electrify the dust particles. (+) ions in the air that are not coupled with the dust particles become surplus ions.

In other words, the surplus ions correspond to (+) ions. The surplus ions are attached to the frame 110 disposed in the electrification space 132 to electrify the frame 110. In particular, the installation frame 114 may be electrified by the surplus ions.

At this time, it is determined whether it is necessary to remove the surplus ions. In other words, it is determined whether or not a discharge is required (S120). The necessity of the discharge may be determined by the input unit 320, the sensor 330, the timer 340, and the like.

A discharge may be requested through the input unit 320. For example, the input unit 320 may include a button for selecting the discharge mode. At this time, the discharge mode means a mode for removing the surplus ions.

In addition, it is possible to detect whether or not a discharge is required by the sensor 330. For example, the sensor 330 senses dust particles in the air and can measure a dust particle removal rate by the electrification apparatus 100. Accordingly, in a case where the dust particle removal rate is equal to or less than a predetermined value, it is possible to operate in the discharge mode.

Alternatively, the sensor 330 may measure whether or not the installation frame 114 is electrified. Generally, since the installation frame 114 is made of a non-conductive material such as plastic, electricity does not pass therethrough. Accordingly, the sensor 330 can determine whether or not a current flows in the installation frame 114 and measure whether or not the installation frame is electrified. Particularly, in a case where the current flowing in the installation frame 114 exceeds a predetermined level, the discharge mode can be operated.

In addition, the sensor 330 measures the removal rate or whether or not electrified, and can visualize the removal rate or whether or not electrified. For example, it is possible to activate the discharge mode selection button or to inform the user of the fact that the operation of the discharge mode is necessary through the audio or display unit. Accordingly, the user can operate the electrification apparatus 100 in the discharge mode through the input unit 320.

In addition, the discharge mode can be operated in accordance with the operation time measured by the timer 340. For example, the first high voltage may be applied to the conductive microfibers 120 and may be operated in the discharge mode after 30 minutes. In other words, the electrification apparatus 100 can be operated in the discharge mode at predetermined time intervals.

In a case where it is determined that the discharge is necessary according to the above conditions, the electrification apparatus 100 can be operated in the discharge mode. In the discharge mode, the first switch 350 is turned off and the second switch 360 is turned on (S130).

It can be understood as a state where, on the electric circuit, one, which is connected, of the two wires connected to the high voltage generator 370 is not connected and the other, which is not connected, of the two wires is connected. In other words, the discharge mode is switched in the general operation mode and a high voltage is applied to the conductive microfibers 120.

Accordingly, the signal of the second switch 360 is transmitted to the high voltage generator 370. The high voltage generator 370 applies a second high voltage to the conductive microfibers 120 (S140).

As described above, in a case where the first high voltage is a (+) voltage, the second high voltage corresponds to a (−) voltage. Accordingly, the conductive microfibers 120 are discharged to generate (−) ions into the air. Accordingly, a (−) ions float in the electrification space 132 and can be coupled with surplus ions which are (+) ions. In other words, the surplus ions can be removed.

At this time, the discharge mode may be operated for a predetermined discharge time. The discharge time may correspond to a predetermined time. For example, in a case where the discharge mode is input through the input unit 320, the discharge mode may be operated for 10 minutes. In addition, the discharge mode may be operated until the value detected by the sensor 330 becomes general.

Accordingly, it is determined whether or not the discharge time has elapsed (S150), in a case where the discharge time has elapsed, the general operation mode is again operated. In other words, the first switch 350 is turned on and the second switch 360 is turned off (S160), and the first high voltage is applied to the conductive microfibers 120.

In addition, the discharge mode may not exist separately, and the first high voltage or the second high voltage may alternately be applied to the conductive microfibers 120. In other words, the first switch 350 and the second switch 360 can be switched at predetermined time intervals.

For example, the first switch 350 and the second switch 360 may be switched at intervals of 30 minutes. Accordingly, the conductive microfibers 120 generate (+) ions for 30 minutes, and then generate (−) ions for 30 minutes. Therefore, the surplus ions generated for 30 minutes can be removed by the ions generated thereafter.

The surplus ions can be removed through such a process.

Hereinafter, another embodiment of the electrification apparatus 100 will be described. At this time, the same reference numerals are used for the same components as those described above, and a description thereof is referred.

Figure 7:
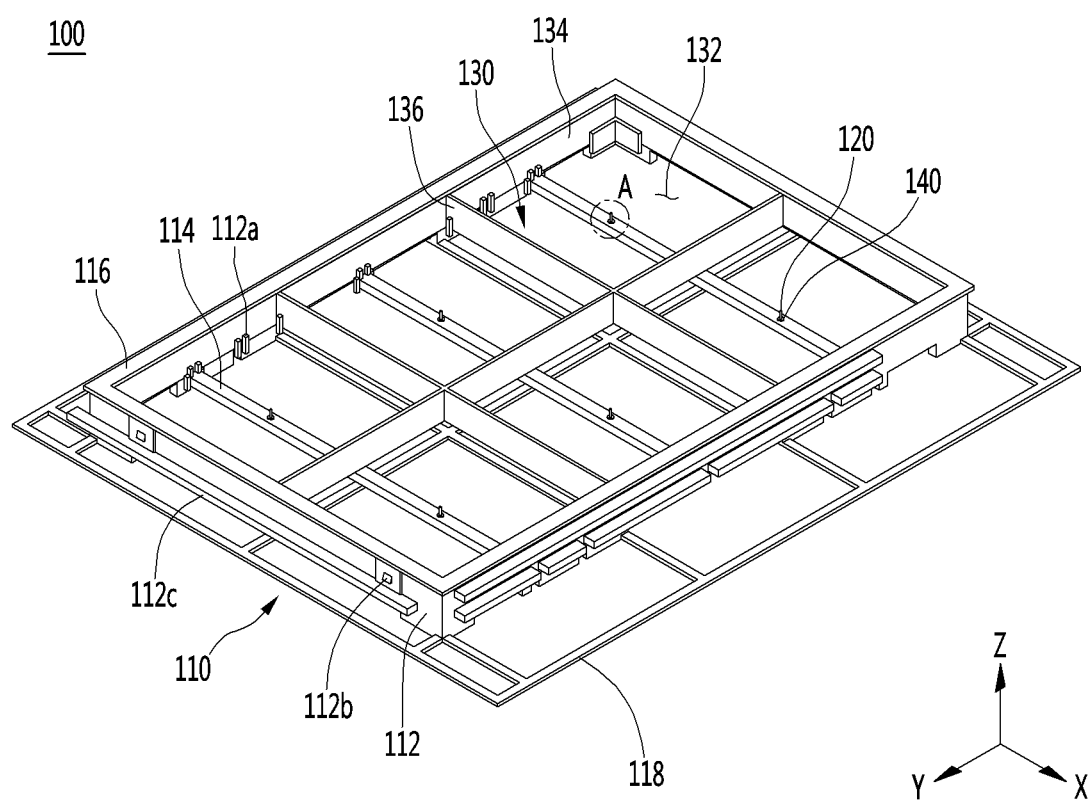
FIG. 7 is a view illustrating an electrification apparatus for electric dust collection according to the second embodiment of the present invention.
Figure 8:
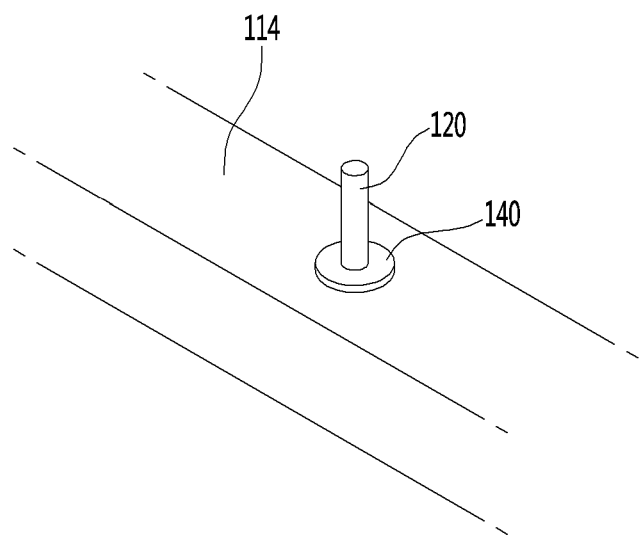
FIG. 8 is an enlarged view of a portion A in FIG. 7.

FIG. 7 is a view illustrating an electrification apparatus for electric dust collection according to a second embodiment of the present invention, and FIG. 8 is an enlarged view of a portion A in FIG. 7.

As illustrated in FIGS. 7 and 8, the conductive microfibers 120 are installed in the frame 110. Specifically, the conductive microfibers 120 may be installed in the installation frame 114.

In addition, the installation frame 114 may be formed with a hole into which the conductive microfiber 120 is inserted. The holes are formed such that the conductive microfibers 120 are positioned at a center of the electrification space 132. Accordingly, when the conductive microfiber 120 is fitted in the holes, the conductive microfibers 120 can be disposed at the correct positions.

The electrification apparatus 100 for electric dust collection according to the teachings of the present invention further includes a ground ring 140. The ground ring 140 is provided in a ring shape to surround the outer side of the conductive microfiber 120. In particular, the ground ring 140 may be in close contact with the conductive microfibers 120.

In addition, the ground ring 140 may be disposed between the conductive microfibers 120 and the installation frame 114. Therefore, the ground ring 140 may function as a fixing support portion for fixing the conductive microfibers 120 to the installation frame 114.

In addition, the ground ring 140 can prevent direct close contact between the installation frame 114 and the conductive microfibers 120. In addition, the ground ring 140 is formed of a conductive material and may be connected to the ground electrode 380.

As described above, the surplus ions are generated, and the installation frame 114 can be conducted. Particularly, since more ions are generated at a portion adjacent to the conductive microfibers 120, the amount of the surplus ions may be large. In other words, as the conductive microfibers 120 are closer to the conductive microfibers 120, there may be a lot of surplus ions.

In addition, surplus ions positioned adjacent to the conductive microfibers 120 further decreases the electrification efficiency. In other words, it is necessary to more effectively remove surplus ions positioned adjacent to the conductive microfibers 120.

The electrification apparatus according to the teachings of the present invention can effectively remove surplus ions positioned adjacent to the conductive microfibers 120 through the ground ring 140. Hereinafter, it will be described in detail.

Figure 9:
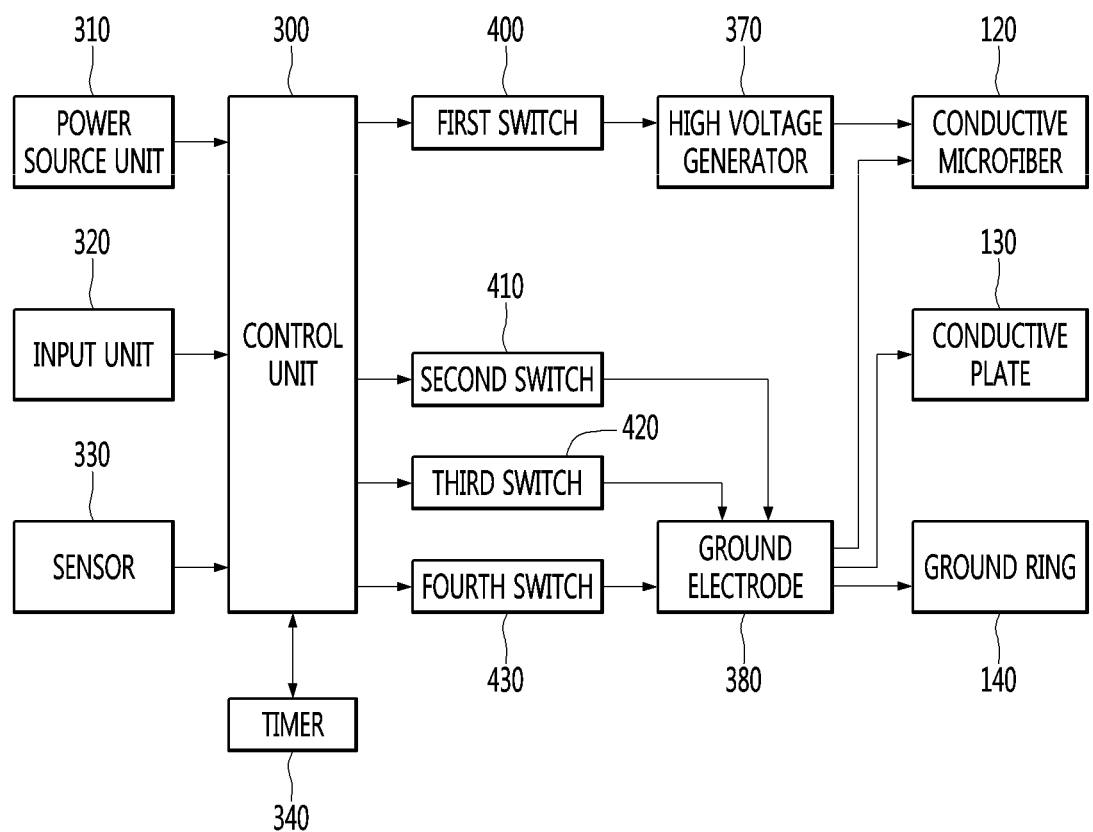
FIG. 9 is a diagram illustrating a control configuration of an electrification apparatus for electric dust collection according to the second embodiment of the present invention.

FIG. 9 is a diagram illustrating a control configuration of an electrification apparatus for electric dust collection according to a second embodiment of the present invention.

As illustrated in FIG. 9, the control unit 300 may transmit signals to the first to fourth switches 400, 410, 420, and 430. Accordingly, a predetermined electrode may be connected to the conductive microfibers 120, the conductive plate 130, and the ground ring 140.

At this time, the first to fourth switches 400, 410, 420, and 430 may correspond to switch circuits that are turned on and off, respectively. In other words, the first to fourth switches 400, 410, 420, and 430 may be turned on or off, respectively.

In a case where the control unit 300 transmits a signal to the first switch 400, the high voltage generator 370 may apply a high voltage to the conductive microfibers 120. At this time, the applied high voltage may correspond to a (+) or (−) voltage. The conductive microfibers 120 are discharged to generate ions in the air.

In a case where the control unit 300 transmits a signal to the second switch 410, the ground electrode 380 is applied to the conductive microfibers 120. In other words, the conductive microfibers 120 may be grounded.

At this time, the first switch 400 and the second switch 410 may correspond to one switching circuit. In other words, the control unit 300 may apply a high voltage or a ground electrode to the conductive microfibers 120. In addition, in a case where both the first switch 400 and the second switch 410 are turned off, the conductive microfibers 120 may be insulated.

In a case where the control unit 300 transmits a signal to the third switch 420, the ground electrode 380 is applied to the conductive plate 130. Accordingly, a potential difference is generated between the conductive plate 130 and the conductive microfibers 120 to which a high voltage is applied. An electric field may be formed in the electrification space 132.

In a case where the control unit 300 transmits a signal to the fourth switch 430, the ground electrode 380 is applied to the ground ring 140. In addition, in a case where the fourth switch 430 is turned OFF, the ground ring 140 can be insulated.

Hereinafter, a control method for removing the surplus ions will be described with such a configuration.

Figure 10:
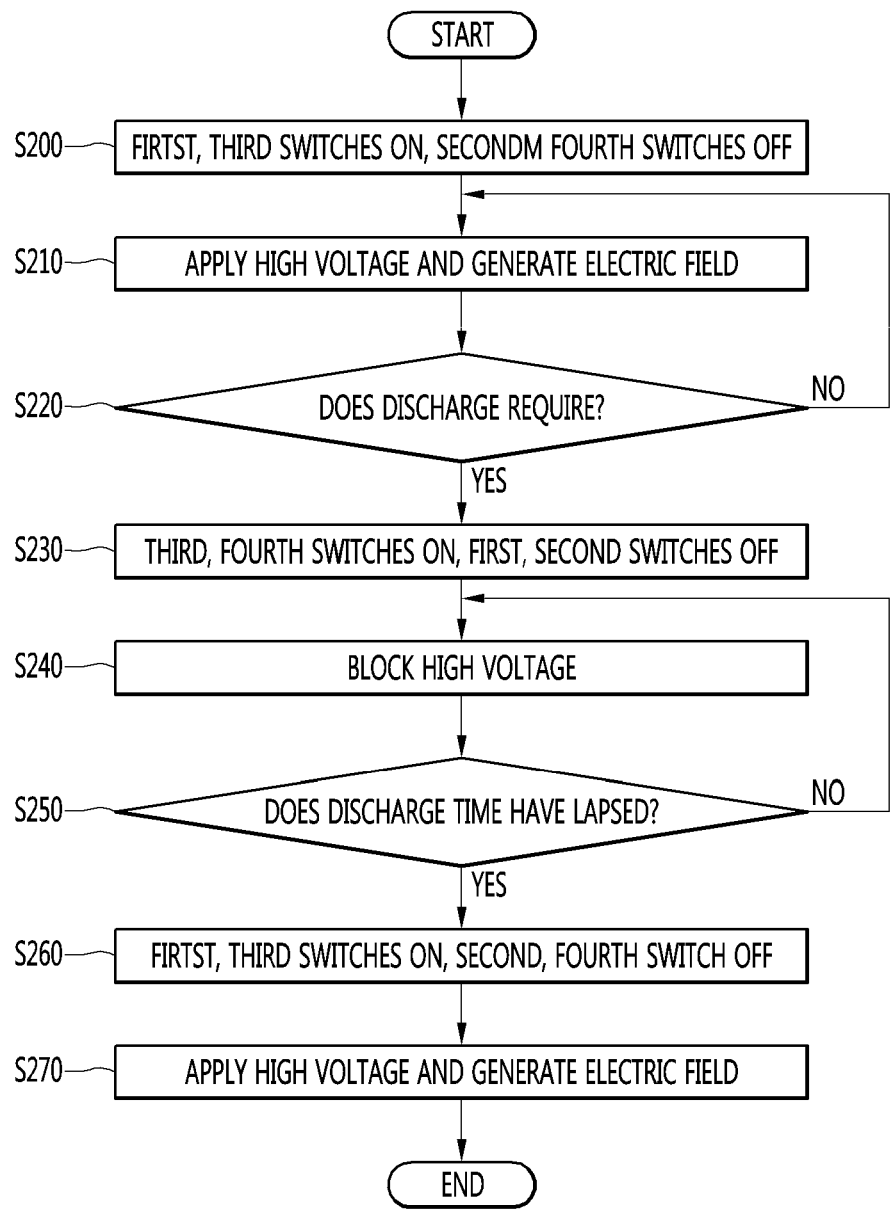
FIG. 10 is a diagram illustrating a control flow of the electrification apparatus for electric dust collection according to the second embodiment of the present invention.

FIG. 10 is a diagram illustrating a control flow of the electrification apparatus for electric dust collection according to the second embodiment of the present invention.

FIG. 10 illustrates a control flow in the case where it is necessary to remove the surplus ions during operation of the electrification apparatus 100. Therefore, the description will be made on the premise that the electrification apparatus 100 is operated.

As illustrated in FIG. 10, the first and third switches 400 and 420 are turned on and the second and fourth switches 410 and 430 are turned off (S200). In a case where the control unit 300 transmits a signal to a predetermined switch, it can be understood that the corresponding switch is turned on. In addition, in a case where the control unit 300 does not transmit a signal to the predetermined switch, it can be understood that the corresponding switch is turned off.

A signal of the first switch 400 is transmitted to the high voltage generator 370 and a signal of the third switch 420 is transmitted to the ground electrode 380. The high voltage generator 370 applies a high voltage to the conductive microfibers 120 and the ground electrode 380 is applied to the conductive plate 130 (S210).

Due to the potential difference between the conductive microfibers 120 and the conductive plate 130, an electric field is formed. The conductive microfibers 120 are discharged to generate ions in the air. This corresponds to the general operation mode of the electrification apparatus 100.

At this time, the fourth switch 430 is turned off, and the ground ring 140 is in an insulated state. In other words, in the general operation mode, the ground ring 140 simply functions to support the conductive microfibers 120.

Then, it is determined whether it is necessary to remove the surplus ions. In other words, it is determined whether or not a discharge is required (S220). The necessity of the discharge may be determined by the input unit 320, the sensor 330, the timer 340, and the like, which are described above.

In a case where it is determined that the discharge is necessary, the discharge mode is operated in which the surplus ions are removed. In the discharge mode, the third and fourth switches 420 and 430 are turned on and the first and second switches 400 and 410 are turned off (S230).

As the first and second switches 400 and 410 are turned off, the conductive microfibers 120 are insulated. In other words, a high voltage is cut off to the electrification apparatus 100 (S240), and the conductive microfibers 120 are not discharged and do not generate ions into the air.

The third switch 420 is continuously turned on. In other words, the conductive plate 130 is grounded regardless of the general operation mode and the discharge mode.

As the fourth switch 430 is turned on, the ground electrode 380 is applied to the ground ring 140. In other words, the ground ring 140 is grounded.

In summary, in the discharge mode, the conductive microfibers 120 are in an insulated or cleaned state, and the conductive plate 130 and the ground ring 140 are in a grounded state.

Accordingly, the surplus ions can be removed through the ground ring 140. In particular, the ground ring 140 is disposed in contact with the conductive microfibers 120. Accordingly, surplus ions positioned adjacent to the conductive microfibers 120 through the ground ring 140 can be effectively removed.

At this time, the discharge mode may be operated for a predetermined discharge time. The discharge time may correspond to a predetermined time. Accordingly, it is determined whether or not the discharge time has elapsed (S250), and in a case where the discharge time has elapsed, it is operated again in the general operation mode. In other words, when the first and third switches 400 and 420 are turned on and the second and fourth switches 410 and 430 are turned off (S260), a high voltage is applied to the conductive microfibers 120 and an electric field is formed.

In addition, the conductive microfibers 120 may be grounded in the discharge mode. In other words, in the discharge mode, the first switch 400 is turned off and the second switch 410 is turned on. In other words, the first switch 400 and the second switch 410 are switched.

Accordingly, surplus ions positioned adjacent to the conductive microfibers 120 can be removed by the conductive microfibers 120. At this time, the ground ring 140 may be omitted from the electrification apparatus 100.

The surplus ions can be removed through such a process.

Figure 11:
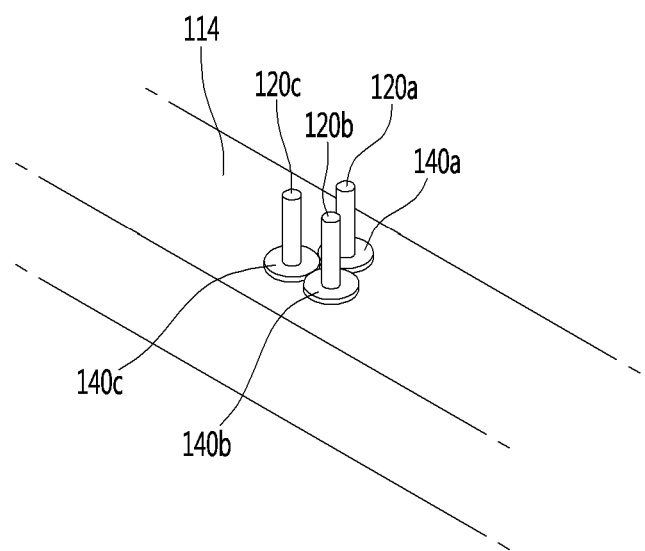
FIG. 11 is a view illustrating an electrification apparatus for electric dust collection according to a third embodiment of the present invention.

FIG. 11 is a view illustrating an electrification apparatus for electric dust collection according to the third embodiment of the present invention.

The third embodiment illustrates another embodiment of the ground ring 140 and FIG. 11 can be understood as a variation of FIG. 8. As illustrated in FIG. 11, a plurality of the ground rings 140 may be provided.

At this time, three ground rings 140 may be provided and divided into a first ground ring 140a, a second ground ring 140b, and a third ground ring 140c, respectively. For the convenience of explanation, the following three grounding rings 140 will be described, but this is not limited thereto.

The first ground ring 140a, the second ground ring 140b, and the third ground ring 140c are formed in a ring shape to surround the conductive microfibers 120, respectively. As described above, the conductive microfibers 120 correspond to a carbon brush formed of a bundle of carbon fibers.

Accordingly, the first ground ring 140a, the second ground ring 140b, and the third ground ring 140c are provided in a shape of dividing and surrounding the conductive microfibers 120. Accordingly, the conductive microfibers 120 are divided into three bundles, which are referred to as a first bundle 120a, a second bundle 120b, and a third bundle 120c.

At this time, the first bundle 120a, the second bundle 120b, and the third bundle 120c correspond to those divided in the installation frame 114. In other words, the first bundle 120a, the second bundle 120b, and the third bundle 120c correspond to those extending to an electric wire from a predetermined electrode and divided the discharged terminal end into a plurality of strands.

Since the conductive microfibers 120 are configured with hundreds or thousands of carbon fibers, it is almost impossible for all the carbon fibers to be discharged in a case where a high voltage is applied. In other words, some carbon fibers fail to discharge and do not generate ions into the air.

At this time, when the conductive microfibers 120 are divided into a plurality of bundles 120a, 120b, and 120c, the number of discharged carbon fibers can be increased. In other words, the discharge efficiency of the conductive microfibers 120 increases.

In addition, since the ground rings 140a, 140b, and 140c are in close contact with the bundles 120a, 120b, and 120c, respectively, surplus ions can be more effectively removed in the discharge mode.

At this time, the control according to this configuration is the same as that illustrated in FIGS. 9 and 10 and described above. In addition, the control unit 300 may sequentially apply a high voltage to the bundles 120a, 120b, and 120c, respectively. In addition, the control unit 300 may sequentially ground the ground rings 140a, 140b, and 140c, respectively.

Figure 12:
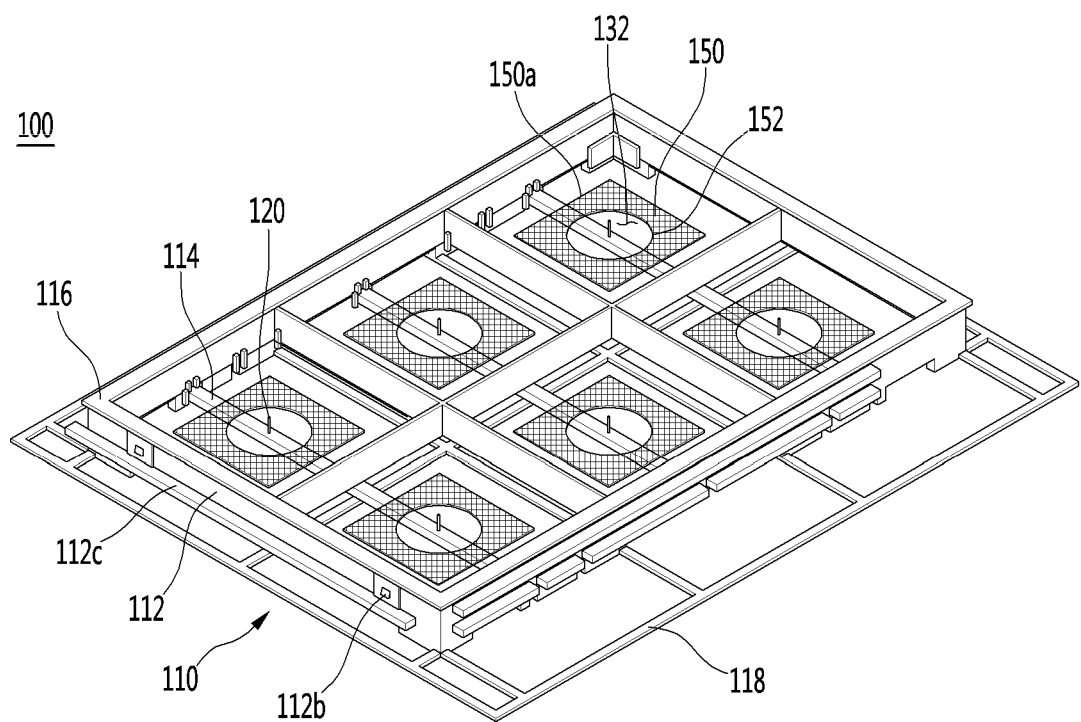
FIG. 12 is a view illustrating an electrification apparatus for electric dust collection according to a fourth embodiment of the present invention.

FIG. 12 is a view illustrating an electrification apparatus for electric dust collection according to the fourth embodiment of the present invention.

As illustrated in FIG. 12, the conductive microfibers 120 are installed in the frame 110. Specifically, the conductive microfibers 120 may be installed in the installation frame 114.

The electrification apparatus 100 for electric dust collection according to the teachings of the present invention further includes a ground sheet 150. The ground sheet 150 is provided in a net shape having a plurality of openings so that air can flow.

The ground sheet 150 is disposed in the electrification space 132. In addition, the ground sheet 150 may be mounted on the installation frame 114. In other words, the ground sheet 150 is disposed in close contact with the installation frame 114.

The ground sheet 150 includes a ground sheet end 150a forming an outer appearance and a through-hole 152 opened circularly about the center thereof. The ground sheet end 150a is formed in a rectangular shape. In other words, the ground sheet 150 corresponds to a rectangular sheet.

At this time, the ground sheet end 150a is disposed apart from the conductive plate 130. In addition, the through-hole 152 is spaced apart from the conductive microfibers 120. In other words, the ground sheet 150 is smaller than the conductive plate 130. The through hole 152 may be formed to avoid the conductive microfibers 120.

At this time, the ground sheet 150 may function to filter relatively large foreign matters introduced into the electrification apparatus 100. In addition, the ground sheet 150 is provided in each electrification space 132, respectively. As illustrated in FIG. 12, six ground sheets 150 are respectively installed in six electrification spaces 132.

At this time, the ground sheet 150 is controlled in the same manner as the ground ring 140 described above. In other words, the ground sheet 150 is insulated in the general operation mode and grounded in the discharge mode. Accordingly, surplus ions existing in the electrification space 132 can be effectively removed.

In particular, since the ground sheet 150 is attached to the installation frame 114, surplus ions attached to the installation frame 114 can be effectively removed. In addition, the electrification apparatus 100 may include the ground sheet 150 and the ground ring 140 together. Accordingly, it is possible to effectively remove surplus ions attached to the installation frame 114 and the conductive microfibers 120.

Figure 13:
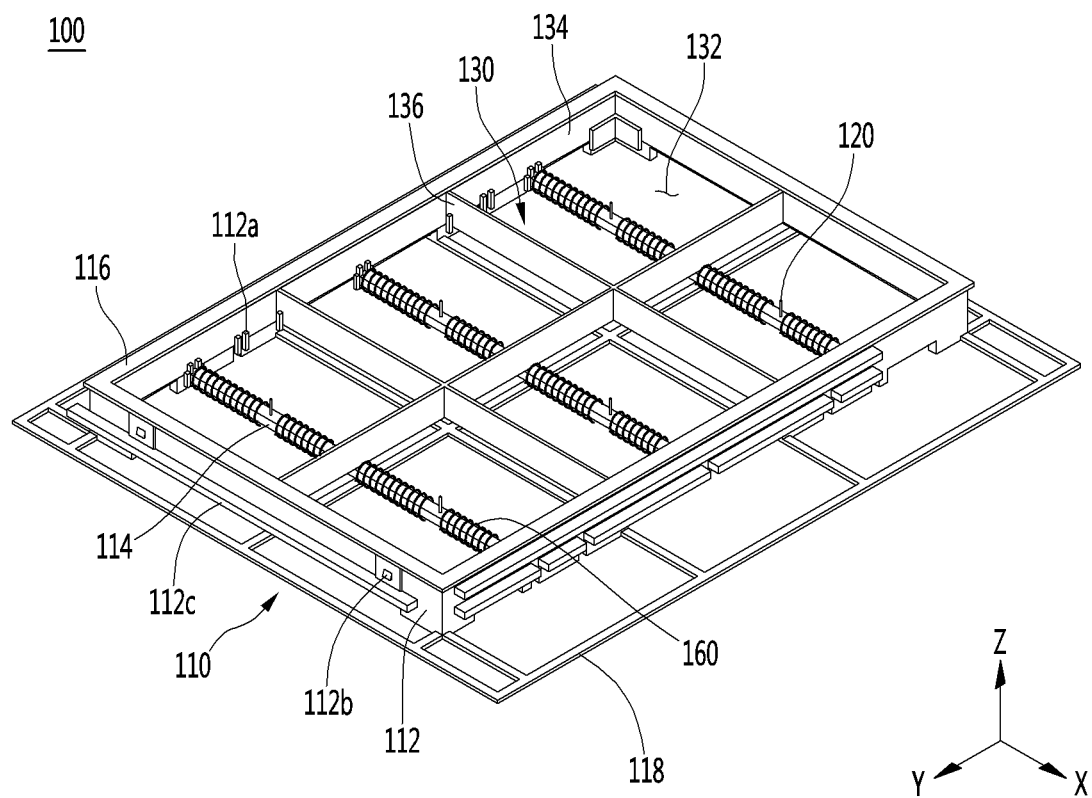
FIG. 13 is a view illustrating an electrification apparatus for electric dust collection according to a fifth embodiment of the present invention.

FIG. 13 is a view illustrating an electrification apparatus for electric dust collection according to the fifth embodiment of the present invention.

As illustrated in FIG. 13, the conductive microfibers 120 are installed in the frame 110. Specifically, the conductive microfibers 120 may be installed in the installation frame 114. At this time, the installation frame 114 extends from the electrification space 132 toward the conductive microfibers 120.

The electrification apparatus 100 for electric dust collection according to the teachings of the present invention further includes a ground coil 160. The ground coil 160 is provided in a state of being wound around the installation frame 114. As illustrated in FIG. 13, the ground coil 160 surrounds the outside of the installation frame 114 and extends along the installation frame 114.

At this time, the ground coil 160 is controlled in the same manner as the grounding ring 140 and the grounding sheet 150, which are described above. In other words, the ground coil 160 is insulated in the general operation mode and grounded in the discharge mode. Accordingly, surplus ions existing in the electrification space 132 can be effectively removed.

In particular, since the ground coil 160 extends to surround the outside of the installation frame 114, surplus ions attached to the installation frame 114 can be effectively removed. In addition, the electrification apparatus 100 may include the ground coil 160 and the grounding ring 140 together. Accordingly, it is possible to effectively remove surplus ions attached to the installation frame 114 and the conductive microfibers 120.

At this time, the ground ring 140, the ground sheet 150, and the ground coil 160 may be collectively referred to as a ground unit. In other words, the electrification apparatus 100 according to the teachings of the present invention includes a ground unit which is insulated in the general operation mode and grounded in the discharge mode. In addition, the ground ring 140, the ground sheet 150, and the ground coil 160 are examples of the ground unit, and the ground unit is not limited thereto.

As described above, surplus ions can be removed through the switching circuit without adding a separate structure. In addition, the surplus ions can be more effectively removed by adding the ground unit.

DESCRIPTION OF REFERENCE NUMERALS

1: air conditioner for vehicle
10: electric dust collection assembly
100: electrification apparatus (for electric dust collection)
110: frame
120: conductive microfiber
130: conductive plate
140, 150, 160: ground unit
300: control unit
370: high voltage generator
380: ground electrode

What is claimed is:

1. An electrification apparatus for electric dust collection comprising:
a frame;
a conductive microfiber disposed at the frame and configured to discharge a high voltage to air to thereby generate ions in the air;
conductive plates that surround the conductive microfiber, that are connected to a ground electrode, and that are configured to generate a potential difference with the conductive microfiber; and
a ground connector that is disposed between the conductive microfiber and one of the conductive plates and that is configured to selectively connect to the ground electrode,
wherein the ground connector is configured to:
disconnect from the ground electrode based on the conductive microfiber discharging the high voltage to the air, and
connect to the ground electrode based on the conductive microfiber not discharging the high voltage to the air.

2. The electrification apparatus for electric dust collection according to claim 1, wherein the conductive plates define an electrification space in which the conductive microfiber is positioned at a center thereof and in which an electric field is generated, and
wherein the ground connector is disposed in the electrification space.

3. The electrification apparatus for electric dust collection according to claim 2, wherein the conductive plates are provided in a rectangular frame shape, and
wherein the electrification space is a rectangular columnar shaped space.

4. The electrification apparatus for electric dust collection according to claim 1, wherein the frame includes:
a main body frame in which the conductive plates are installed; and
an installation frame that extends from the main body frame and in which the conductive microfiber is installed, and
wherein the ground connector is in contact with the installation frame.

5. The electrification apparatus for electric dust collection according to claim 4, wherein the ground connector includes a ground ring that surrounds an outside of the conductive microfiber and that is disposed between the installation frame and the conductive microfiber.

6. The electrification apparatus for electric dust collection according to claim 5, wherein the ground ring is one of a plurality of ground rings that divide the conductive microfiber into a plurality of bundles and that surround the plurality of bundles, respectively.

7. The electrification apparatus for electric dust collection according to claim 4, wherein the ground connector includes a ground sheet that is in contact with a side of the installation frame and that defines a plurality of openings.

8. The electrification apparatus for electric dust collection according to claim 7, wherein the ground sheet includes a ground sheet end that defines a boundary of the ground sheet, the ground sheet defining a through-hole that is opened circularly about the conductive microfiber.

9. The electrification apparatus for electric dust collection according to claim 8, wherein the ground sheet end defines a rectangular shape corresponding to one of the conductive plates and is spaced apart from the conductive plates.

10. The electrification apparatus for electric dust collection according to claim 4, wherein the ground connector includes a ground coil that surrounds an outside of the installation frame and extends along the installation frame.

11. The electrification apparatus for electric dust collection according to claim 1, further comprising:
a voltage generator configured to generate the high voltage and to supply the high voltage to the conductive microfiber.

12. The electrification apparatus for electric dust collection according to claim 11, further comprising:
a plurality of switches connected to the voltage generator and the ground electrode, respectively.

13. The electrification apparatus for electric dust collection according to claim 12, wherein the plurality of switches comprise:
a first switch connected to the voltage generator; and
a second switch, a third switch, and a fourth switch that are connected to the ground electrode.

14. The electrification apparatus for electric dust collection according to claim 13, wherein the conductive microfiber is configured to:
- discharge the high voltage to the air based on the first and third switches being turned on and the second and fourth switches being turned off; and
- stop discharging the high voltage to the air based on the third and fourth switches being turned on and the first and second switches being turned off.

* * * * *